(12) United States Patent
Weimer

(10) Patent No.: US 9,189,382 B2
(45) Date of Patent: Nov. 17, 2015

(54) NONCONTIGUOUS REPRESENTATION OF AN ARRAY

(71) Applicant: Red Hat, Inc., Raleigh, NC (US)

(72) Inventor: Florian Weimer, Stuttgart (DE)

(73) Assignee: Red Hat, Inc., Raleigh, NC (US)

( * ) Notice: Subject to any disclaimer, the term of this patent is extended or adjusted under 35 U.S.C. 154(b) by 258 days.

(21) Appl. No.: 13/890,064

(22) Filed: May 8, 2013

(65) Prior Publication Data

US 2014/0337572 A1    Nov. 13, 2014

(51) Int. Cl.
*G06F 12/02* (2006.01)

(52) U.S. Cl.
CPC .................................... *G06F 12/023* (2013.01)

(58) Field of Classification Search
CPC ..................................................... G06F 12/023
USPC .................. 711/114, 170; 365/185.2, 185.03, 365/185.05, 185.18, 185.19, 185.21, 365/185.24, 189.15, 189.011
See application file for complete search history.

(56) References Cited

U.S. PATENT DOCUMENTS 6,266,665 B1 * 7/2001 Vaidyanathan et al. .............. 1/1
6,308,185 B1   10/2001 Grarup et al.
7,502,906 B2   3/2009 Moir et al.
7,792,880 B2   9/2010 Arnold et al.
2010/0077172 A1  3/2010 Pizlo

OTHER PUBLICATIONS

F.R.A. Hopgood. Compiling Techniques. "Data Structure Mappings." New York: American Elsevier Inc. 1969. pp. 11-15. Print.
Stelios Joannou et al. "An Empirical Evaluation of Extendible Arrays." University of Leicester, Department of Computer Science. P.M. Pardalos and S. Rebennack (Eds.): SEA 2011, LNCS 6630, pp. 447-458, 2011. Print.

* cited by examiner

*Primary Examiner* — Jasmine Song
(74) *Attorney, Agent, or Firm* — Haynes and Boone, LLP

(57) ABSTRACT

A system and method for storing a composite array including a reference array and one or more arraylets is provided. A set of contiguous memory locations for a reference array including one or more slots is allocated based on a quantity of bits in a binary representation of a logical array length. Each slot in the reference array corresponds to a position of a bit in the binary representation. For each bit corresponding to a slot that is determined to satisfy a condition, a set of contiguous memory locations is allocated for an arraylet, and a reference from the slot to the arraylet is provided. A largest arraylet having a greatest length of the allocated arraylets is identified, and a slice of adjacent data elements corresponding to a beginning of the logical array is placed into the largest arraylet.

20 Claims, 7 Drawing Sheets

NONCONTIGUOUS REPRESENTATION OF AN ARRAY

FIELD OF DISCLOSURE

The present disclosure generally relates to memory storage, and more particularly to storing a data structure in memory.

BACKGROUND

In computer programming, it is often convenient to refer to a plurality of data objects as a group, or array. An array's size may be assigned at the outset, and a block of memory space suitable for containing an array of that size is allocated. The array may be allocated statically (e.g., when the program is initially loaded) or dynamically (e.g., at a point in the program's execution at which it is determined that the array will be needed). Even though the program allocates the array dynamically, the array's size may be fixed when that allocation occurs. Contiguous memory locations may be allocated for the array.

Contiguous allocation of large arrays, however, may be problematic. For example, if the array sizes vary over the lifetime of a process, fragmentation issues may arise.

Additionally, it may be inconvenient to restrict arrays to fixed sizes. The array's ultimate needed size may be unknown but potentially very large when the array is initially allocated, and it may be wasteful to initially allocate the maximum possible array size. A traditional solution to this problem is determining that the array includes more elements than the memory so far allocated to it can hold and then allocating space twice as large as the array's previous space. The current content is copied into the new space's first half, and then new elements are added to the new space's second half, possibly initializing the second-half contents in the process. Pointers to the array are then adjusted to refer to the array's new location. This approach has become popular because it enables the program to avoid allocating space of the maximum size when an array that may never grow to that size is initially allocated. But it also has certain disadvantages, such as wasted memory space.

Further, a persistent data structure may refer to a data structure that preserves the previous version of itself when it is modified. Persistent data structures are particularly common in logical and functional programming. Such a data structure is effectively immutable, as its operations do not (visibly) update the structure in-place, but instead yields a new updated structure. A data structure that is partially persistent may refer to a data structure that has all versions of the data structure accessible but only the newest version of the data structure is modifiable. A data structure that is fully persistent may refer to a data structure that has all versions of the data structure both accessible and modifiable. While persistence can be achieved by simple copying and modifying the data structure, this may be inefficient in terms of CPU (central processing unit) and RAM (random access memory) usage.

Moreover, the computer executing a program may allocate memory for objects from a free memory area called a heap. Memory is allocated to, and freed from, the heap in blocks. Eventually, when the objects are no longer being referenced by the program, the memory allocated for the created objects is reclaimed through a garbage collection process. Garbage collection may refer to a process of identifying unused areas of main memory storage. The garbage collection process clears the objects from memory whereby the once allocated memory is again available for use. Allocating memory for persistent data structures may be challenging because a persistent data structure preserves the previous version of itself when it is modified.

BRIEF SUMMARY

This disclosure relates to memory storage. Methods, systems, and techniques for storing an array in memory.

According to an embodiment, a system for storing a composite array including a reference array and one or more arraylets includes a logical array module to determine a length of a logical array and to determine a binary representation of the length of the logical array. The system also includes a reference array allocator to allocate, based on a quantity of bits in the binary representation, a set of contiguous memory locations for a reference array including one or more slot. Each slot in the reference array corresponds to a position of a bit in the binary representation. The system further includes an arraylet allocator to determine whether each bit corresponding to a slot satisfies a condition. For each bit corresponding to a slot that is determined to satisfy the condition, the arraylet allocator allocates a set of contiguous memory locations for an arraylet having a length based on a position of the slot in the reference array and provides in the slot a reference to the arraylet. The system also includes a placement module to identify a largest arraylet having a greatest length of the allocated arraylets and to place into the largest arraylet a first slice of adjacent data elements corresponding to a beginning of the logical array.

According to another embodiment, a method of storing a composite array including a reference array and one or more arraylets includes determining, by one or more processors, a length of a logical array. The method also includes determining a binary representation of the length of the logical array. The method further includes allocating, based on a quantity of bits in the binary representation, a set of contiguous memory locations for a reference array including one or more slots. Each slot in the reference array corresponds to a position of a bit in the binary representation. The method also includes determining whether each bit corresponding to a slot satisfies a condition. The method further includes for each bit corresponding to a slot that is determined to satisfy the condition allocating a set of contiguous memory locations for an arraylet having a length based on a position of the slot in the reference array and providing in the slot a reference to the arraylet. The method also includes identifying a largest arraylet having a greatest length of the allocated arraylets. The method further includes placing into the largest arraylet a slice of adjacent data elements corresponding to a beginning of the logical array.

According to another embodiment, a non-transitory machine-readable medium including a plurality of machine-readable instructions that when executed by one or more processors is adapted to cause the one or more processors to perform a method including: determining a length of a logical array; determining a binary representation of the length of the logical array; allocating, based on a quantity of bits in the binary representation, a set of contiguous memory locations for a reference array including one or more slots, each slot in the reference array corresponding to a position of a bit in the binary representation; determining whether each bit corresponding to a slot satisfies a condition; for each bit corresponding to a slot that is determined to satisfy the condition, allocating a set of contiguous memory locations for an arraylet having a length based on a position of the slot in the reference array and providing in the slot a reference to the arraylet; identifying a largest arraylet having a greatest length of the allocated arraylets; and placing into the largest arraylet a slice of adjacent data elements corresponding to a beginning of the logical array.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

DETAILED DESCRIPTION

Figure 1:
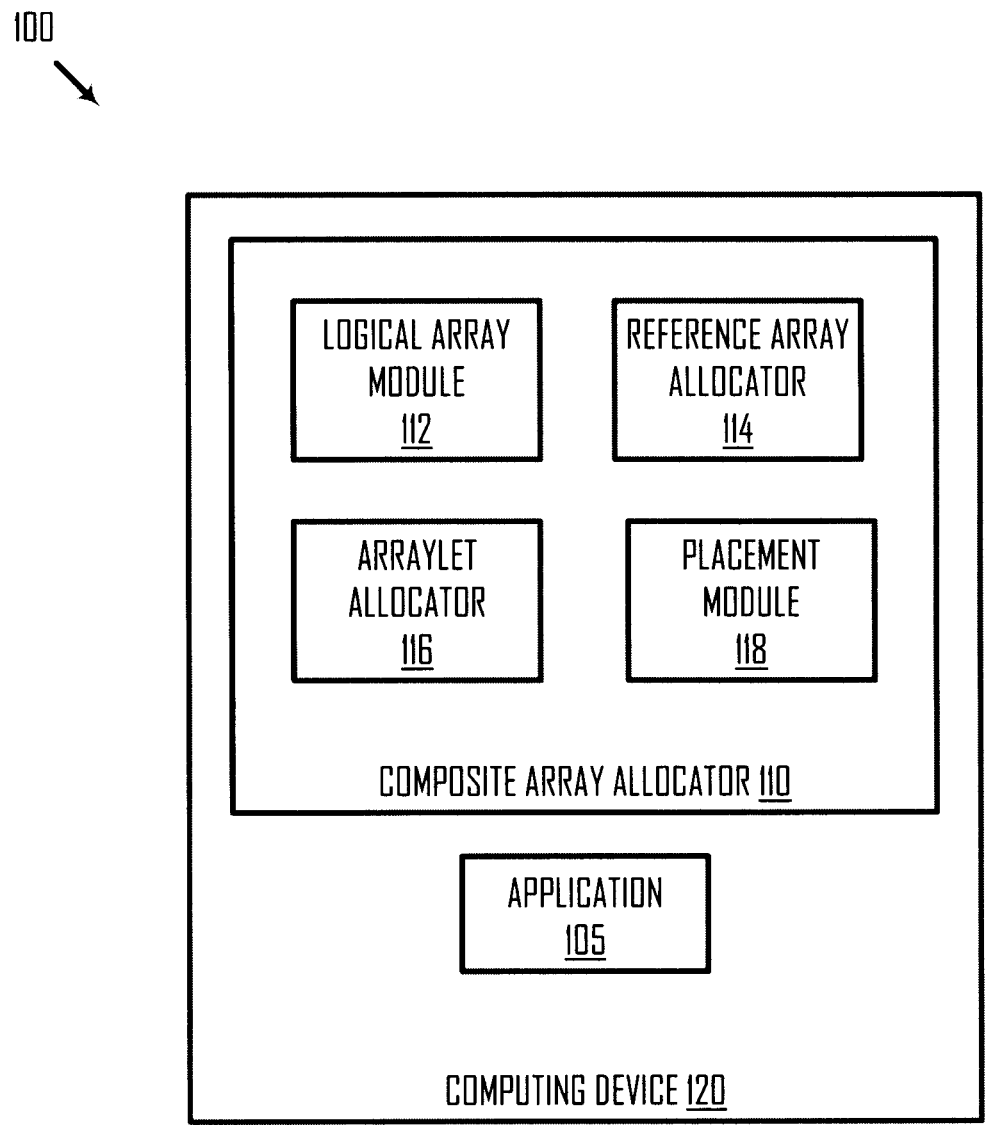
FIG. 1 is a simplified block diagram illustrating a system for storing a composite array including a reference array and one or more arraylets, according to an embodiment.

I. Overview
II. Example System Architecture For Storing an Noncontiguous Array
   A. Reference Array
   B. Arraylet(s)
   C. Place Data Elements into Arraylet(s)
   D. Optimize Memory Allocation
     1. Leading Zeros
     2. Trailing Zeros
III. Access the Array
   A. Read From the Array
   B. Modify the Array
     1. Modify a Data Element in the Array
     2. Append Data Element(s) to the Array
     3. Remove Data Element(s) From the Array
IV. Example Method
V. Example Computing System I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

The disclosure provides techniques to store a data structure. For example, this disclosure provides techniques to store a logical array of N elements, indexed from 0 to N−1. In functional programming, an array that is laid out in contiguous memory may be copied as a whole for a non-destructive update, thus preserving the original version of the array. It may be time consuming and use a lot of memory to make a complete copy of the array each time the array is updated in a purely functional setting.

The present disclosure provides techniques to efficiently read from and update the array (e.g., modify a data element in the array, append a data element to the array, or delete a data element from the end of the array) while retaining constant-time access to the array elements. Appending to the array may be implemented in amortized logarithmic time in terms of the array length. Moreover, for certain types of garbage collection, it may be desirable to have less variance in terms of object sizes so that the object sizes allocated from the heap are reduced. Allocating arrays of different sizes over the lifetime of a process may lead to fragmentation issues.

In an embodiment, a system for storing a composite array including a reference array and one or more arraylets includes a logical array module that determines a length of a logical array and that determines a binary representation of the length of the logical array. The system also includes a reference array allocator that allocates, based on a quantity of bits in the binary representation, a set of contiguous memory locations for a reference array including one or more slot. Each slot in the reference array corresponds to a position of a bit in the binary representation. The system further includes an arraylet allocator that determines whether each bit corresponding to a slot satisfies a condition. For each bit corresponding to a slot that is determined to satisfy the condition, the arraylet allocator allocates a set of contiguous memory locations for an arraylet having a length based on a position of the slot in the reference array and provides in the slot a reference to the arraylet. The system also includes a placement module that identifies a largest arraylet having a greatest length of the allocated arraylets and that places into the largest arraylet a first slice of adjacent data elements corresponding to a beginning of the logical array.

In an example, when the bit in the binary representation represents a binary one, an arraylet may be created having a length equal to the value of the binary one in the binary representation. A reference array may be created having a length based on the quantity of bits in the binary representation of N. The reference array may be an array of pointers of length ceil(log 2(n)) and have one or more slots, each slot possibly pointing to an arraylet. The slot at position i in the reference array may include a pointer to an arraylet of size $2^i$. Further, the slot corresponding to a bit in the binary representation of N that is not set (e.g., when the bit represents a binary zero) may be left uninitialized.

II. Example System Architecture for Storing a Noncontiguous Array

FIG. 1 is a simplified block diagram illustrating a system 100 for storing a composite array including a reference array and one or more arraylets, according to an embodiment.

System 100 includes an application 105 and a composite array allocator 110 running on a computing device 120. Computing device 120 may be a workstation, computer, server, game console, set-top box, kiosk, embedded system, mobile device (e.g., a mobile phone, personal digital assistant, tablet, and laptop), or other device having at least one processor and memory.

Computing device 120 may allocate memory for a data structure and store the data structure in memory for application 105. Application 105 may access or modify the data structure at a later point in time. In an example, composite array allocator 110 allocates memory for a logical array for application 105 by allocating memory for a composite array including a reference array and one or more arraylets. The one or more arraylets represents a slice of the entire logical array.

Figure 2:
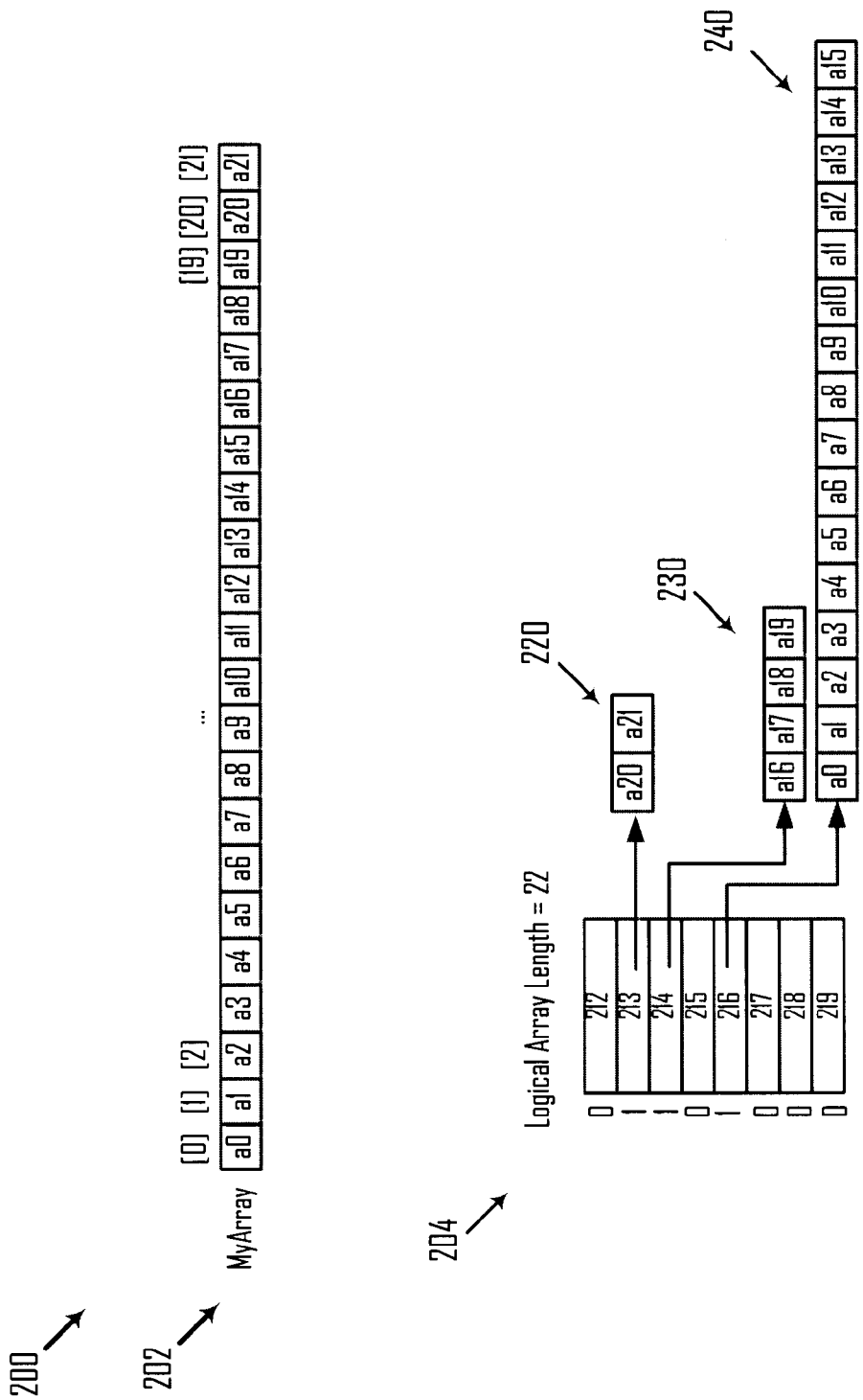
FIG. 2 is a simplified block diagram illustrating a logical array and a composite array including a reference array and one or more arraylets, according to an embodiment.

FIG. 2 is a simplified block diagram 200 illustrating a logical array and a composite array including a reference array and one or more arraylets, according to an embodiment. Diagram 200 includes a logical array 202 having 22 data elements (a0, a1, . . . , a21), indexed from 0-21. Logical array 202 may be referred to as MyArray, whereas its first and twentieth elements may be referred to as MyArray[0] and MyArray[19]. Composite array allocator 110 may allocate memory for data elements of logical array 202 and store the data elements in memory.

Composite array allocator 110 includes a logical array module 112, reference array allocator 114, arraylet allocator 116, and placement module 118. In an embodiment, logical array module 112 determines a length of logical array 202 and determines a binary representation of the length of logical array 202. In an example, logical array module 112 determines a length of logical array 202 as being 22. The binary representation of 22 is "10110." The right-most digit in the binary representation is the least significant bit, and the left-most digit in the binary representation is the most significant bit. The binary representation of the logical array length may have W bits. The least significant digit is at position 0 in the binary representation, and the positions of the bits increase up to W−1 for the most significant bit.

A. Reference Array

Memory for reference array 204 may be allocated based on the binary representation of the logical array length. In an embodiment, reference array allocator 114 allocates, based on a quantity of bits in the binary representation, a set of contiguous memory locations for a reference array including one or more slots. Each slot in the reference array corresponds to a position of a bit in the binary representation.

Computing device 120 may include a processor (shown in FIG. 6) that stores a data type representation. The quantity of bits in the binary representation may depend on a data type size (e.g., an integer or word size) of computing device 120. The quantity of bits in the binary representation may be an indication of how much memory to allocate for the reference array.

In an example, W is the size (in bits) of the word used to store the logical array length. For simplicity, the present disclosure describes W as being eight and the size of the data type representation as being eight bits. It should be understood, however, that the size of the data type representation may be greater than eight bits (e.g., 16, 32, 64, 128, or greater than 128 bits). Computing device 120 may represent the binary representation of 22 as 00010110, which includes eight bits. The quantity of bits in the binary representation may indicate a quantity of slots in the reference array. Reference array allocator 114 may allocate a set of eight contiguous memory locations for reference array 204.

Each memory location may represent a slot in reference array 204. Reference array 204 includes eight slots, slots 212-219. Each slot in reference array 204 corresponds to a position of a bit in binary representation 00010110. In an example, the slots in reference array 204 sequentially correspond to the sequential order of bits in the binary representation of the logical array length. For instance, slots in reference array 204 may correspond to bit positions in the binary representation based on an order of least significant bit to most significant bit. In particular, the least significant bit of the binary representation may correspond to a slot at a beginning of the reference array (e.g., position zero in reference array 204). Accordingly, the slot corresponding to the least significant bit is closer to a beginning of reference array 204 compared to other slots in reference array 204. Adjacent bits in the binary representation may correspond to adjacent slots in reference array 204, and the most significant bit of the binary representation may correspond to a slot at an end of reference array 204 (e.g., position eight in reference array 204).

Slot 212 is at position 0 in reference array 204 and corresponds to the bit at position 0 in the binary representation.
Slot 213 is at position 1 in reference array 204 and corresponds to the bit at position 1 in the binary representation.
Slot 214 is at position 2 in reference array 204 and corresponds to the bit at position 2 in the binary representation.
Slot 215 is at position 3 in reference array 204 and corresponds to the bit at position 3 in the binary representation.
Slot 216 is at position 4 in reference array 204 and corresponds to the bit at position 4 in the binary representation.
Slot 217 is at position 5 in reference array 204 and corresponds to the bit at position 5 in the binary representation.
Slot 218 is at position 6 in reference array 204 and corresponds to the bit at position 6 in the binary representation.
Slot 219 is at position 7 in reference array 204 and corresponds to the bit at position 7 in the binary representation.

In an embodiment, reference array allocator 114 calculates a total quantity of slots in the reference array. The total quantity of slots may be referred to as the initial quantity of slots in the reference array ($S_i$), which may be further reduced by applying optimization techniques described further below. In an example, reference array allocator 114 determines the initial quantity of slots in the reference array by applying an equation equivalent to the following:

$$S_i = W - clz(N),\qquad\text{Equation (1),}$$

where $S_i$ represents the initial quantity of slots, W represents the quantity of bits in the binary representation of the logical array length, and N represents the length of the logical array.

The bit operation clz counts the number of zero bits preceding the most significant one bit. This bit operation is described further below.

B. Arraylet(s)

In an embodiment, arraylet allocator 116 determines whether each bit corresponding to a slot satisfies a condition. When a bit corresponding to a given slot in the reference array is determined to not satisfy the condition, the given slot does not reference an arraylet. In contrast, for each bit corresponding to a slot that is determined to satisfy the condition, arraylet allocator 116 allocates a set of contiguous memory locations for an arraylet having a length based on a position of the slot in the reference array. Arraylet allocator 116 may provide in the slot a reference to the arraylet. The allocated arraylets may be in contiguous or noncontiguous memory locations with respect to each other.

A bit may satisfy the condition in various ways. In an example, when a bit represents a binary one, the bit satisfies the condition. In keeping with this example, in FIG. 2, the "0" bits in the binary representation corresponding to slots 212, 215, and 217-219 do not satisfy the condition. Accordingly, slots 212, 215, and 217-219 do not reference an arraylet associated with logical array 202. In contrast, the "1" bits in the binary representation corresponding to slots 213, 214, and 216 satisfy the condition. Accordingly, each of slots 213, 214, and 216 references an arraylet that represents a slice of logical array 202.

The arraylet length may be based on the value of the corresponding bit in the binary representation. For example, the length of the arraylet referenced by a slot may depend on the position of the slot in the reference array. In an example, to determine the length of a given arraylet referenced by a slot at position i in reference array 204, arraylet allocator 116 applies an equation equivalent to $2^i$, where a result of the equation is equal to the arraylet length. As such, the arraylet length associated with each successive slot in reference array 204 may be equal to two times the arraylet length associated with the preceding slot in sequential order. In this way, the number of different object sizes that is stored on the garbage collected heap may be reduced and fragmentation may be reduced.

The following is a description of the bit in the binary representation corresponding to slot 213. This description applies as well to other bits in the binary representation corresponding to a slot in the reference array and that satisfy the condition. The "1" bit corresponding to slot 213 satisfies the condition, and slot 213 is at position 1 in reference array 204. Arraylet allocator 116 may determine that the length of an arraylet 220 is two and allocates two contiguous memory locations for arraylet 220. Arraylet allocator 116 may provide in slot 213 a reference to arraylet 220.

Arraylet allocator 116 may perform similar actions to allocate one or more additional arraylets for the logical array. For example, arraylet allocator 116 may determine that the length of arraylet 230 is four and allocate four contiguous memory locations for arraylet 230. Arraylet allocator 116 may provide in slot 214 a reference to arraylet 230. Similarly, arraylet allocator 116 may determine that the length of arraylet 240 is eight and allocate eight contiguous memory locations for arraylet 240. Arraylet allocator 116 may provide in slot 216 a reference to arraylet 240. Slot 216 corresponds to a bit that is the most significant one bit in the binary representation of the logical array length.

In an embodiment, arraylet allocator 116 includes a buddy allocator that divides memory into partitions to satisfy a memory request. Dividing the memory into partitions may be advantageous when allocating arraylets having a length of a power of two because they can be allocated with little external fragmentation and no internal fragmentation. A single allocation may be used for multiple very small arraylets, with several slot pointers pointing within the same allocation, in case the buddy allocator does not support arbitrarily small allocations.

A sum of the arraylet lengths of arraylet 220, 230, and 240 is 22, and the length of logical array 202 is 22. Although the sum of the arraylet lengths (e.g., 22) in FIG. 2 is equal to the length of logical array 202 (e.g., 22), other embodiments having a sum of the arraylets being different from the logical array length are within the scope of this disclosure.

In an example, a sum of the arraylet lengths is greater than the logical array length. This may result in unused memory space, but may provide an advantage resulting in simplifying the data structure shape because rounding up to a multiple of a small power of two may simplify the shape of the arraylets. For instance, allocating space for a logical array having 24 data elements instead of 23 data elements may include allocating a set of contiguous memory locations for each of two arraylets (one arraylet having a length of 16 and another arraylet having a length of 8) rather than allocating a set of contiguous memory locations for each of four arraylets (one arraylet having a length of 16, another arraylet having a length of 4, another arraylet having a length of 2, and another arraylet having a length of 1).

C. Place Data Elements into Arraylet(s)

Each arraylet represents a slice of the logical array. The data elements of the logical array may be placed into the arraylets in sequential order with the lower indexed data elements of logical array 202 being placed into the largest arraylet and the higher indexed data elements of the logical array 202 being placed into the smallest arraylet. The largest arraylet may be referenced by a slot corresponding to a bit that satisfies the condition and the corresponding bit is the most significant one bit in the binary representation.

Placement module 118 may place into the one or more arraylets a slice of adjacent data elements of the logical array until all of the data elements of the logical array have been placed into an arraylet. In an example, placement module 118 sequentially places into the largest arraylet, starting from the first index to the last index of the logical array, the data elements corresponding to the beginning of the logical array until the length of the arraylet is reached and then wraps into the next largest arraylet. As such, the largest arraylet stores the data elements corresponding to the lowest indexes of logical array 202. In another example, placement module 118 sequentially places into the smallest arraylet, starting from the last index to the first index of the logical array, the data elements corresponding to the end of the logical array until the length of the arraylet is reached and then wraps into the next smallest arraylet.

In an embodiment, placement module 118 identifies a largest arraylet having a greatest length of the allocated arraylets and places into the largest arraylet a first slice of adjacent data elements corresponding to a beginning of the logical array. Arraylet 220 has a length of two, arraylet 230 has a length of four, and arraylet 240 has a length of eight. As such, placement module 118 may identify arraylet 240 as being the largest arraylet and place into arraylet 240 a slice of adjacent data elements to fill arraylet 240. Arraylet 240 has a length of 16 and is indexed from 0-15, and placement module 118 may place into arraylet 240 sixteen data elements of logical array 202 from indexes 0-15. Accordingly, arraylet 240 may include data elements a0-a15 of logical array 202.

Placement module 118 may determine whether all data elements corresponding to logical array 202 have been placed into an arraylet in memory. When it is determined that all data elements corresponding to logical array 202 have not been placed into an arraylet in memory, placement module 118 may place into a second arraylet a second slice of adjacent data elements corresponding to logical array 202. The second slice may be adjacent to the first slice and the second arraylet may be a next greatest length after the largest arraylet. In keeping with the above example, placement module 118 identifies arraylet 230 as being the next largest arraylet after arraylet 240, and places into arraylet 230 a second slice of adjacent data elements to fill arraylet 230. Arraylet 230 has a length of four and is indexed from 0-3, and placement module 118 may place into arraylet 230 four data elements of logical array 202 from indexes 16-19 (e.g., the indexes of logical array 202 following the indexes of data elements that have been placed into arraylet 240). Accordingly, arraylet 230 may include data elements a16-a19 of logical array 202. Arraylet 230 is referenced by a slot corresponding to a bit that satisfies the condition, and the corresponding bit is closest to the most significant bit in the binary representation that satisfies the condition compared to other bits in the binary representation that satisfy the condition. Logical array 202 still includes data elements, a20-a21, that have not yet been placed into an arraylet.

Placement module 118 may identify arraylet 220 as being the next largest arraylet after arraylet 230, and place into arraylet 220 a third slice of adjacent data elements to fill arraylet 220. Arraylet 220 has a length of two and is indexed from 0-1, and placement module 118 may place into arraylet 220 two data elements of logical array 202 from indexes 20-21 (e.g., the indexes of logical array 202 following the indexes of data elements that have been placed into arraylet 230). Accordingly, arraylet 220 may include data elements a20-a21 of logical array 202. As such, the first 16 elements of logical array 202 are placed into an arraylet referenced by a slot at position 4 in reference array 204, the next four elements of logical array 202 are placed into an arraylet referenced by a slot at position 2 in reference array 204, and the next two elements of logical array 202 are placed into an arraylet referenced by a slot at position 1 in reference array 204.

It should be understood that placement module 118 may place data elements into the arraylets in any order. In an example, placement module 118 places data elements into arraylet 240 before placing data elements into arraylets 220 and 230. In another example, placement module 118 places data elements into arraylet 230 before placing data elements into arraylets 220 and 240. In another example, computing device 120 includes a single instruction multiple data processor, and placement module 118 places, for example, 32 data elements at a time into an arraylet.

As discussed above and further emphasized here, FIG. 1 is merely an example, which should not unduly limit the scope of the claims. For example, it should be understood that one or more components in FIG. 1 (e.g., logical array module 112, reference array allocator 114, arraylet allocator 116, or placement module 118) may be combined with another module. In an example, reference array allocator 114 and arraylet allocator 116 are combined into a single module. It should also be understood that one or more modules in FIG. 1 (e.g., logical array module 112, reference array allocator 114, arraylet allocator 116, or placement module 118) may be separated into more than one module. In an example, reference array allocator 114 is split into a first reference array allocator and a second reference array allocator.

Further, computing device 120 may be coupled to a network (not shown). The network may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

D. Optimize Memory Allocation

In FIG. 2, some of the slots in reference array 204 are uninitialized and do not reference an arraylet. It may be desirable to avoid allocating memory to these slots.

1. Leading Zeros

For instance, the three slots in reference array 204 after the last slot that references an arraylet are uninitialized and do not reference an arraylet. To reduce the set of contiguous memory locations that are allocated for the reference array, computing device 120 may apply an operation to avoid allocating memory locations for uninitialized slots. In an embodiment, computing device 120 applies a bit operation clz that counts the number of zero bits preceding the most significant one bit. This operation may be implemented using a low gate count and may be available in a processor in computing device 120.

In an embodiment, reference array allocator 114 determines a quantity of leading zeros preceding the most significant one bit in the binary representation of the logical array length, updates the binary representation by discarding the quantity of leading zeros from the binary representation, and identifies a second quantity of bits in the updated binary representation. Reference array allocator 114 may allocate the set of contiguous memory locations for the reference array based on the quantity of bits in the binary representation array and the quantity of leading zeros, where the quantity of slots in the reference array is equivalent to the second quantity of bits in the updated binary representation.

In an example, reference array allocator 114 determines the quantity of leading zeros preceding the most significant one bit for 00010110 (binary representation of 22) to be three and accordingly, allocates a set of five memory locations for reference array 204 having five slots 212-216 (the difference between eight and three) rather than eight slots.

Figure 3:
FIG. 3A is a simplified block diagram illustrating a reference array having a reduced quantity of slots, according to an embodiment.
FIG. 3B is another simplified block diagram illustrating a reference array having a reduced quantity of slots, according to an embodiment.

FIG. 3A is a simplified block diagram illustrating reference array 204 having five slots based on the leading zero count for a logical array length of 22, according to an embodiment.

2. Trailing Zeros

Further, slots before the first slot that references an arraylet in the reference array may be uninitialized and thus do not reference an arraylet. To reduce the set of contiguous memory locations that are allocated for the reference array, computing device 120 may apply an operation to avoid allocating memory locations for these uninitialized slots. In an embodiment, computing device applies a bit operation ctz that counts the number of zero bits following the least significant one bit.

In an embodiment, reference array allocator 114 determines a quantity of trailing zeros following the least significant one bit in the binary representation, updates the binary representation by discarding the quantity of trailing zeros from the binary representation, and identifies a second quantity of bits in the updated binary representation. Reference array allocator 114 may allocate the set of contiguous memory locations for the reference array based on the quantity the quantity of bits in the binary representation and the quantity of trailing zeros, where the quantity of slots in the reference array is equivalent to the second quantity of bits in the updated binary representation.

In an example, reference array allocator 114 determines the number of trailing zeros following the least significant one bit for 10110 (binary representation of 22) to be one and accordingly, allocates a set of seven memory locations for reference array 204 having seven slots 213-219 (the difference between eight and one) rather than eight slots.

FIG. 3B is a simplified block diagram illustrating reference array 204 having seven slots based on the trailing zero count for a logical array length of 22, according to an embodiment.

In another example, both operations may be implemented to reduce the set of contiguous memory locations that are allocated for the reference array. Equations (2) and (3) below may be used to calculate slot indexes in the reference arrays where the references to the arraylets are stored. In an example, the slot index in the reference array is computed by applying an equation equivalent to the following:

$$S_r = W - 1 - clz(N \text{ XOR } K) - ctz(N), \qquad \text{Equation (2)}$$

where $S_r$ represents the slot index among this reduced quantity of slots, W represents the quantity of bits in the binary representation of the logical array length, N represents the length of the logical array, and K represents the logical array index value. If equation (2) is applied, the leading ctz (N) slots of the reference array are not referenced, and no memory locations need to be allocated for them.

Further, although the clz and ctz bit operations are discussed, this is not intended to be limiting. Any operations that effectively reduce the quantity of slots in the reference array may be used. In an example, computing device 120 applies a POPCOUNT bit operation that counts the number of one bits in a binary representation. For example, binary representation of 22 is 10110, and POPCOUNT (10110) is three. In an example, the slot index in the reference array is computed by applying an equation equivalent to the following:

$$S_r = \text{POPCOUNT}(N \text{ AND } (2^{\wedge}(S_t-1-clz(N \text{ XOR } K)-1)), \quad \text{Equation (3)}$$

where $S_r$ represents the slot index among this reduced quantity of slots, N represents the length of the logical array, $S_t$ represents the initial quantity of slots, and K represents the logical array index value. A result of applying equation (3) may be that only the slots that are actually occupied are stored in memory. For array lengths that are powers of 2, the ctz(N) subtraction in equation (2) may achieve the same result as equation (3).

In another example, the total quantity of slots needed in the reference array is computed by applying an equation equivalent to the following:

$$S_t = \text{POPCOUNT}(N), \quad \text{Equation (4)}$$

where $S_t$ represents the total quantity of slots in the reference array, and N represents the length of the logical array.

In an embodiment, the reference array has two length fields, a length field for the array size that is visible to application 105, and another length field that controls the shape of the array. Accordingly, an array having 30 data elements, for example, may be allocated as one 32-element arraylet, plus a reference array with just one slot (that is, after compression).

III. Access the Array

The logical array indexes may be mapped to a physical storage location of computing device 120. Composite array allocator 110 may receive an access request to access a data element of the logical array. Logical array module 112 may determine the location where the access is to occur by determining which arraylet includes the data element and then determining the appropriate position in the arraylet that includes the data element.

A. Read from the Array

In an embodiment, logical array module 112 receives an access request directed to a composite array in memory. The access request may be a request to access one or more data elements of the logical array and may include a logical array index value of logical array 202 to access. In an example, the data element at the logical array index value of logical array 202 is read and provided to application 105.

Logical array module 112 may determine which slot in reference array 204 references a given arraylet corresponding to the logical array index value. In an example, logical array module 112 determines which slot in the reference array references the given arraylet by applying an equation equivalent to the following:

$$S = W-1-clz(N \text{ XOR } K), \quad \text{Equation (4)}$$

where S represents the slot in the reference array that references the given arraylet, W represents the quantity of bits in the binary representation of the logical array length, N represents the length of the logical array, and K represents the logical array index value. In equation (4), the clz operation counts the number of leading zeros in the binary representation of its integer argument. Further, the XOR operation may be equivalent to the bitwise exclusive-or/carryless add.

After determining the arraylet that includes the data element of interest, logical array module 112 may determine the arraylet index of the given arraylet corresponding to the logical array index value of the logical array 202, and provide access to the data element at the arraylet index of the given arraylet. Logical array module 112 may provide access to an arraylet index by calculating an offset into the given arraylet. In an example, logical array module 112 calculates the offset within the given arraylet by applying an equation equivalent to the following:

$$I = K \text{ AND } (2^{\wedge}S-1), \quad \text{Equation (5)}$$

where I represents the offset into the given arraylet, S represents the slot in the reference array that references the given arraylet, and K represents the logical array index value. The logical array index value (e.g., K in equation (5)) is located in the given arraylet at the offset. The data element at the arraylet index may then be accessed. The whole indexing operation may be implemented in constant time. Further, in equation (5), the offset within the arraylet is calculated using the original value of S, even if the slots in the reference array have been reduced (e.g., by applying the clz or ctz bit operations).

Further, to increase efficiency, code that iterates over the entire logical array may be split into iterations on the arraylets (inner loop) within an iteration over the slots (outer loop), avoiding repeated index calculations.

B. Modify the Array

1. Modify a Data Element in the Array

The access request may include a modification request to modify one or more data elements of the logical array. The modification request may include a data element and the logical array index value of logical array 202 at which to place the data element. In an example, logical array module 112 replaces the data element at the logical array index value of logical array 202 with the data element included in the modification request. Logical array module 112 may access the appropriate arraylet index as described in this disclosure. In an example, when the quantity of elements in the array does not change, logical array module 112 may locate (and update) the storage location in memory to access as described.

2. Append Data Element(s) to the Array

When the array is extended, logical array module 112 may locate and update the storage locations in memory as described below.

In an example, one or more data elements may be appended to the array. In an embodiment, logical array module 112 receives an append request directed to a composite array in memory. The append request may include one or more data elements to append to the logical array. In an example, reference array allocator 114 allocates, based on the append request, memory for an updated version of the logical array. Reference array allocator 114 may allocate memory for an updated version of the logical array in a purely functional way by determining an updated length of the updated version of the logical array and determining a second binary representation of the updated length of the logical array.

In an embodiment, an element is appended to the lowest used slot of the new reference array at slot ctz (N+1). For this slot, a new arraylet may be allocated, and the data elements in the smaller arraylets (at lower slots in the original reference array) may be copied into this new arraylet. The last data element of the new arraylet may be the data element included in the append request. This approach may readily generalize to the extension of the array by multiple elements in a single operation.

In an example, in-place array extension is implemented. In this example, a data element may be appended to an initial reference array, and the initial reference array and updated reference array may have a common length. As such, the initial reference array and updated reference array may be the same because they have the same length.

Figure 4:
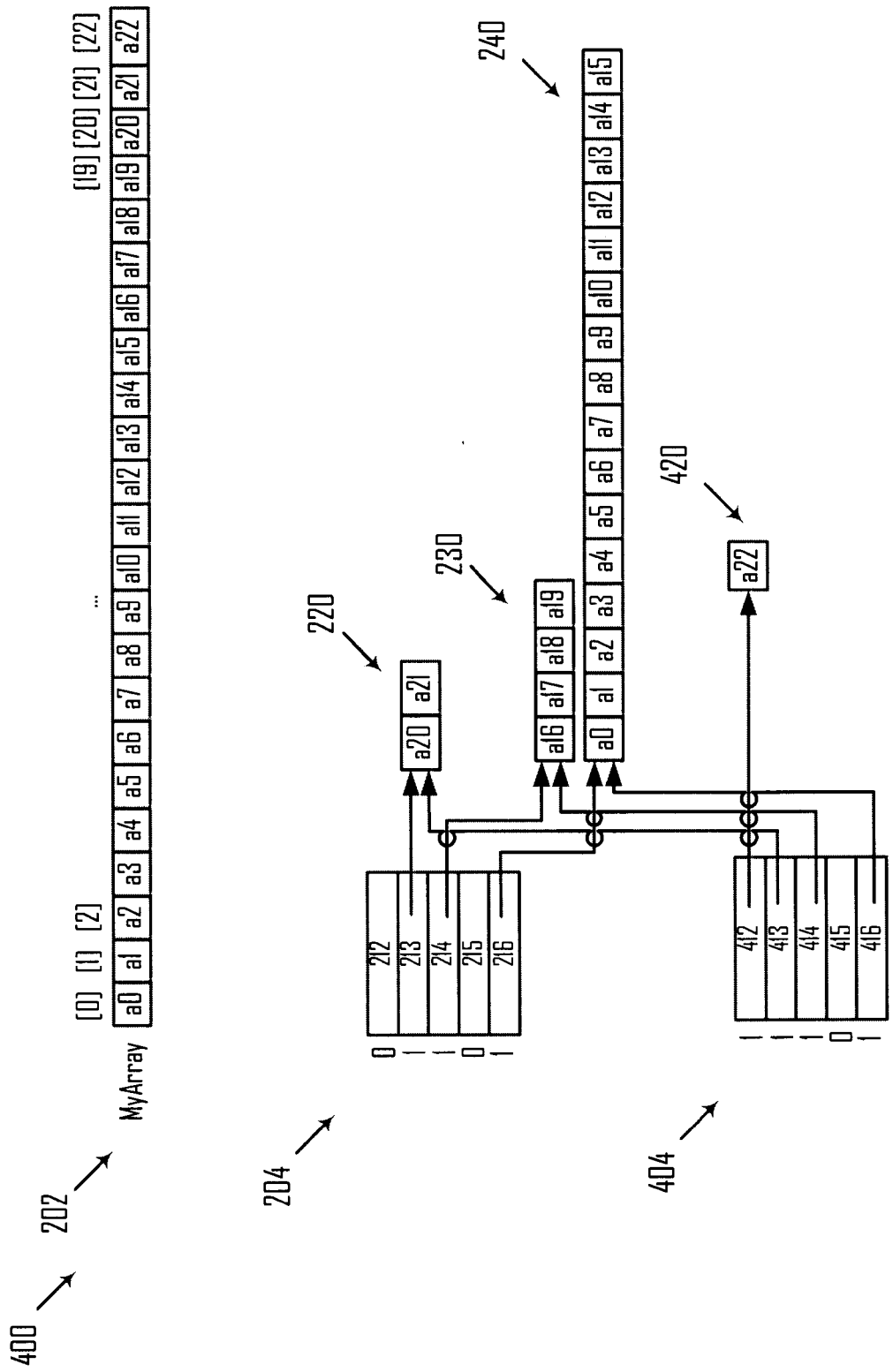
FIG. 4 is a simplified block diagram illustrating a data element appended to a logical array, according to an embodiment.

FIG. 4 is a simplified block diagram 400 illustrating a data element appended to logical array 202 in FIG. 2, according to an embodiment. Diagram 400 includes logical array 202 including an additional data element, a22, and a composite array including reference array 204 and arraylets 220, 230, and 240. The data element a22 may be included in the append request and appended to logical array 202, increasing the logical array length to 23. The binary representation of 23 is 10111. In an example, reference array allocator 114 may allocate, based on the quantity of bits in the binary representation of 23, a set of contiguous memory locations for a reference array 404 including one or more slots. Each slot in reference array 404 corresponds to a position of a bit in the binary representation of 23. Reference array 404 includes eight slots, slots 412-419.

To append a22 to logical array 202, arraylet allocator 116 may determine whether reference array 204 includes a slot that does not reference an arraylet. When reference array 204 is determined to include a slot that does not reference an arraylet, arraylet allocator 116 identifies a slot in reference array 204 having a position closest to a beginning of reference array 204 and that does not reference an arraylet. The identified slot in reference array 204 is slot 212. Arraylet allocator 116 may identify a slot in reference array 404 corresponding to the identified slot in reference array 204. The identified slot in reference array 404 (e.g., slot 412) may reference a newly created arraylet. A slot in reference array 204 may correspond to a slot in reference array 404 when the slots are each at the same position in their respective reference arrays. As such, slot 212 at position zero in reference array 204 corresponds to slot 412 at position zero in reference array 204. Arraylet allocator 116 may allocate a set of contiguous memory locations for a new arraylet 420 having a length based on the position of slot 412 in reference array 404 and provide in identified slot 412 a reference to new arraylet 420.

Placement module 118 may place into arraylet 420 a slice of one or more adjacent data elements corresponding to an end of logical array 402 and including the data element in the append request. Arraylet 420 has a length of one and includes one data element, a22.

For each slot in reference array 404 that is after slot 412 in reference array 404 (e.g., has a higher position number than slot 412) and that corresponds to a bit in the updated binary representation that satisfies the condition, arraylet allocator 116 may provide in the slot in reference array 404 a reference to an arraylet that is referenced by the corresponding slot in reference array 204. In an example, slots 413, 414, and 416 in reference array 404 reference the same arraylets as slots 213, 214, and 216 in reference array 204, respectively. Accordingly, one or more arraylets from the previous version of the array may be shared with the updated data structure. Thus, it may be unnecessary to create a whole new copy of the array. Applying these techniques to a fully persistent data structure may address concerns related to lack of sharing between versions and repeated copying of the data structure.

In some cases such as in the example illustrated in FIG. 4, a data element may be appended to the logical array without deallocating the existing arraylet structure in physical memory. If the existing arraylet structure is changed, the appropriate data elements may be placed into the new arraylet. For example, if another data element is appended to logical array 202 in FIG. 4, the updated logical array length is 24. The binary representation of 24 is 11000. Accordingly, reference array allocator 114 may allocate a new reference array, and arraylet allocator 116 may allocate a new arraylet having an arraylet length of 8. A slot in the new reference array corresponding to slot 416 may also reference arraylet 240, and a slot in the new reference array may reference the new arraylet. The new arraylet may include data elements a16-a23.

In contrast, when reference array 204 is determined to not include a slot that does not reference an arraylet, arraylet allocator 116 allocates a set of contiguous memory locations for a new arraylet having a length based on the position of a slot in the new reference array that satisfies the condition. Here, the new reference array may include more slots than the previous reference array. This may occur, for example, when the logical array goes from having 31 data elements (binary representation of 31 is 11111) to 32 data elements (binary representation of 32 is 100000). Arraylet allocator 116 may identify a slot in the new reference array corresponding to a bit that satisfies the condition and provide in the identified slot a reference to the new arraylet. Placement module 118 may place into the new arraylet all data elements of the logical array and the data element in the append request.

The size of the reference array may be further decreased. The XOR operation may assist in obtaining a persistent data structure with an efficient append operation because it may ensure that the largest arraylet contains the data elements located at the beginning of the logical array, and the smaller arraylets cover the end of the logical array, which is where the data elements are appended to the logical array. Consequently, less copying of an older version may result when appending a data element to the logical array.

In an example, reference array allocator 114 determines the quantity of slots in the reference array by applying an equation equivalent to the following:

$$P = W - 1 - clz(N \text{ XOR } K) - ctz(N), \quad \text{Equation (6),}$$

where P represents the index of the slot in the reference array that references the arraylet including a data element corresponding to the logical array index value, W represents the quantity of bits in the binary representation of the logical array length, N represents the length of the logical array, and K represents the logical array index value.

Additionally, the XOR operation may assist in the omission of one or more slots that does not reference an arraylet. Consequently, physical storage elements may be allocated only for elements that are actually needed, avoiding a restriction to particular logical array lengths.

3. Remove Data Element(s) from the Array

When the array is contracted, logical array module 112 may locate and update the storage locations in memory. In an example, a data element may be removed from the array (e.g., from the end of the array). In an embodiment, logical array module 112 receives a remove request directed to a composite array in memory. A data element may be removed from the lowest used slot of the initial reference array.

In an example, reference array allocator 114 allocates, based on the remove request, memory for an updated version of the logical array. Reference array allocator 114 may allocate memory for an updated version of the logical array in a purely functional way by determining an updated length of the updated version of the logical array and determining a second binary representation of the updated length of the logical array.

Arraylet allocator 116 may determine whether to allocate memory for an arraylet based on whether a slot in the updated reference array corresponds to a slot in the initial reference array and both slots corresponds to bits that satisfy the condition. Arraylet allocator 116 may provide a reference in a slot in the updated reference array to an already existing arraylet that is referenced by the corresponding slot in the initial reference array. This disclosure describes techniques in which arraylet allocator 116 may determine whether to provide a reference in the updated reference array to an already existing arraylet. This disclosure also describes techniques in which arraylet allocator 116 may determine whether to allocate a set of contiguous memory locations for a new arraylet having a length based on the position of a given slot in the updated reference array and provide in the given slot a reference to the new arraylet. As such, these techniques will not be repeated here. This approach may readily generalize to the removal of multiple elements from the array in a single operation.

IV. Example Method

Figure 5A:
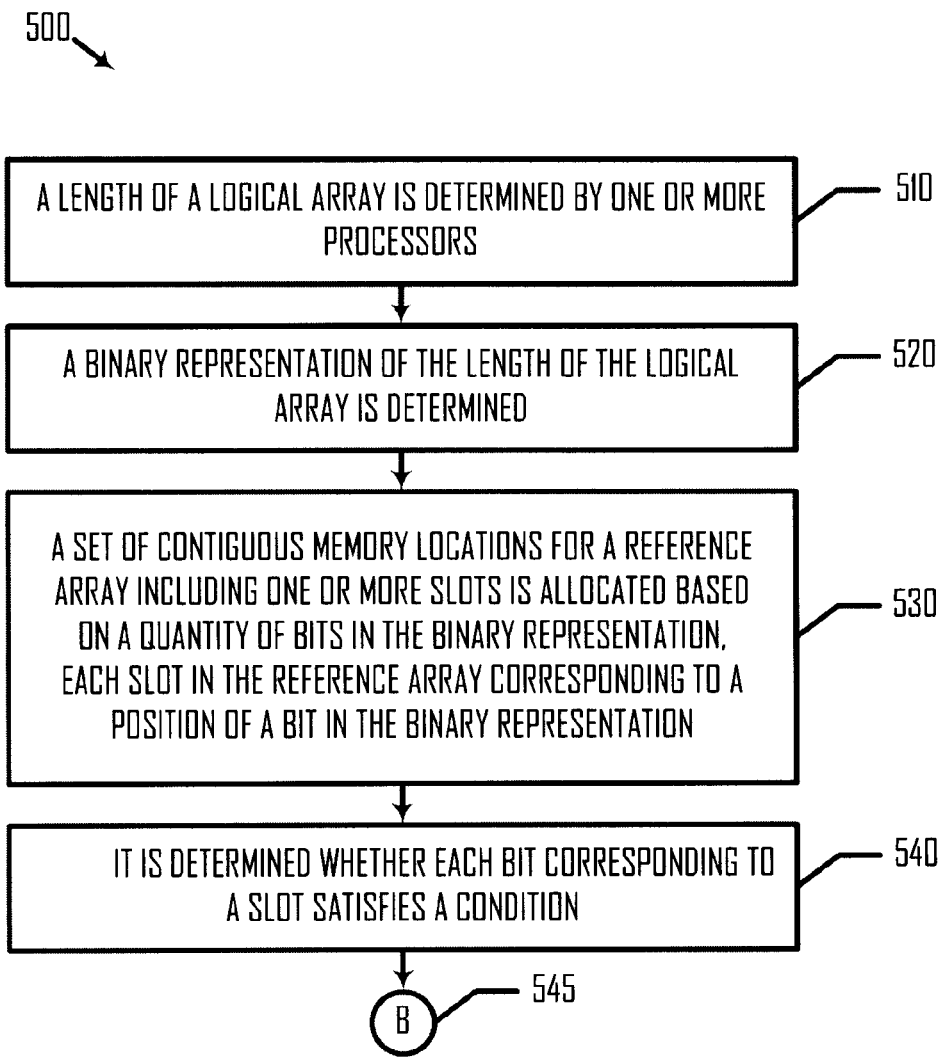
FIGS. 5A and 5B are simplified flowcharts illustrating a method of storing a composite array including a reference array and one or more arraylets, according to an embodiment.
Figure 5B:
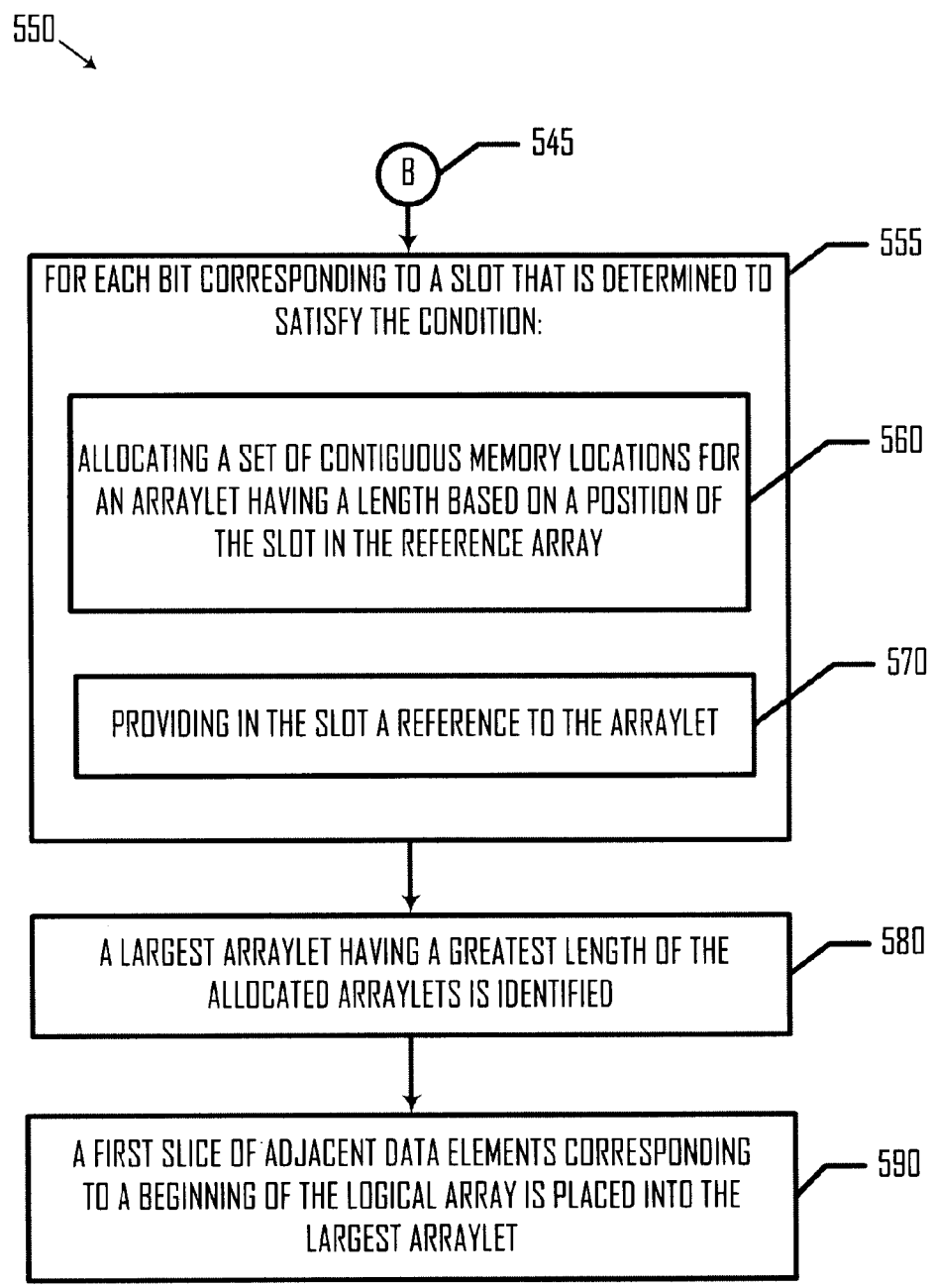

FIGS. 5A and 5B are simplified flowcharts illustrating a method 500, 550 of storing a composite array including a reference array and one or more arraylets, according to an embodiment. Method 500, 550 is not meant to be limiting and may be used in other applications.

In FIG. 5A, method 500 includes steps 510-545. In a step 510, a length of a logical array is determined by one or more processors. In an example, logical array module 112 determines, by one or more processors, a length of a logical array. In a step 520, a binary representation of the length of the logical array is determined. In an example, logical array module 112 determines a binary representation of the length of the logical array.

In a step 530, a set of contiguous memory locations for a reference array including one or more slots is allocated based on a quantity of bits in the binary representation, each slot in the reference array corresponding to a position of a bit in the binary representation. In an example, reference array allocator 114 allocates, based on a quantity of bits in the binary representation, a set of contiguous memory locations for a reference array including one or more slots, each slot in the reference array corresponding to a position of a bit in the binary representation.

In a step 540, it is determined whether each bit corresponding to a slot satisfies a condition. In an example, arraylet allocator 116 determines whether each bit corresponding to a slot satisfies a condition. The flow of method 500 then proceeds to a step B 545 that continues to step B 545 in FIG. 5B. In method 550 of FIG. 5B, Step B 545 proceeds to a step 555. In step 555, for each bit corresponding to a slot that is determined to satisfy the condition, steps 560 and 570 are implemented. In step 560, a set of contiguous memory locations for an arraylet having a length based on a position of the slot in the reference array is allocated. In an example, arraylet allocator 116 allocates a set of contiguous memory locations for an arraylet having a length based on a position of the slot in the reference array. In step 570, a reference to the arraylet is provided in the slot. In an example, arraylet allocator 116 provides in the slot a reference to the arraylet.

In a step 580, a largest arraylet having a greatest length of the allocated arraylets is identified. In an example, placement module 118 identifies a largest arraylet having a greatest length of the allocated arraylets. In a step 590, a slice of adjacent data elements corresponding to a beginning of the logical array is placed into the largest arraylet. In an example, placement module 118 places into the largest arraylet a slice of adjacent data elements corresponding to a beginning of the logical array.

It is also understood that additional method steps may be performed before, during, or after steps 510-590 discussed above. It is also understood that one or more of the steps of method 500 described herein may be omitted, combined, or performed in a different sequence as desired.

V. Example Computing System

Figure 6:
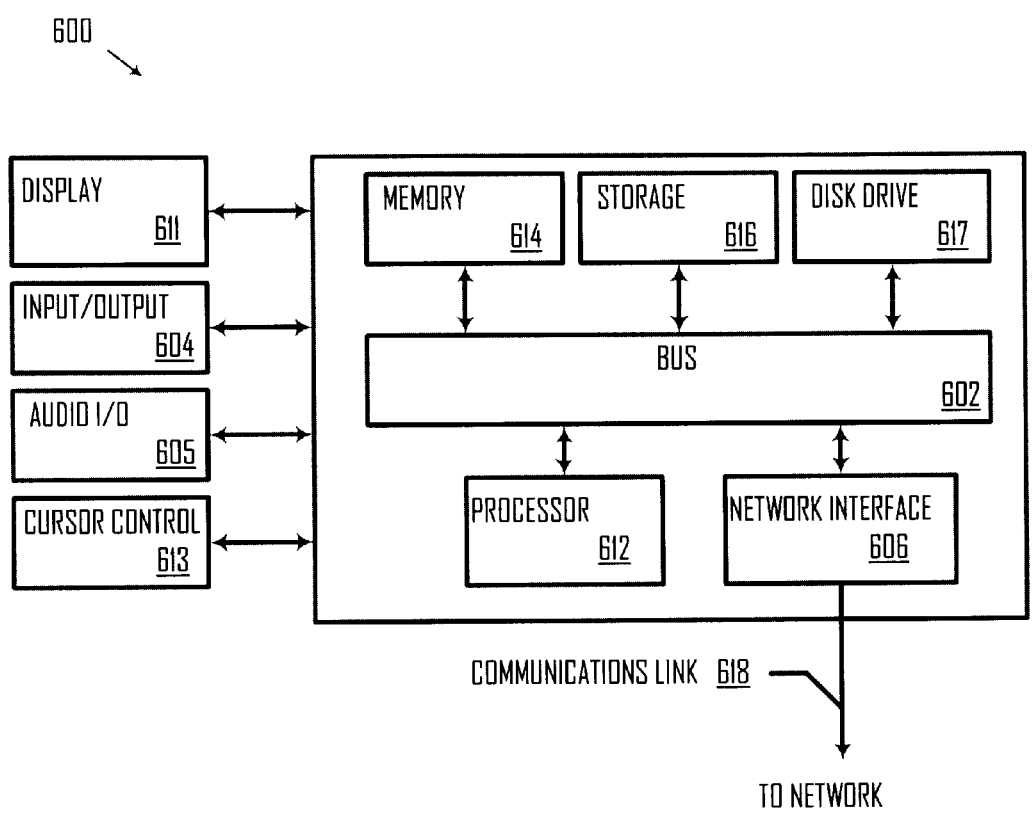
FIG. 6 is a block diagram of an electronic system suitable for implementing one or more embodiments of the present disclosure.

FIG. 6 is a block diagram of a computer system 600 suitable for implementing one or more embodiments of the present disclosure. Computer system 600 may include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or a server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons or links, etc., and sends a corresponding signal to bus 602. I/O component 604 may also include an output component such as a display 611, and an input control such as a cursor control 613 (such as a keyboard, keypad, mouse, etc.). An optional audio input/output component 605 may also be included to allow a user to use voice for inputting information by converting audio signals into information signals. Audio I/O component 605 may allow the user to hear audio. A transceiver or network interface 606 transmits and receives signals between computer system 600 and other devices via a communication link 618 to a network. In an embodiment, the transmission is wireless, although other transmission mediums and methods may also be suitable. A processor 612, which may be a micro-controller, digital signal processor (DSP), or other processing component, processes these various signals, such as for display on computer system 600 or transmission to other devices via communication link 618. Processor 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor 612 and other components by executing one or more sequences of instructions contained in system memory component 614. Logic may be encoded in a computer readable medium, which may refer to any medium that participates in providing instructions to processor 612 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 614, and transmission media includes coaxial cables, copper wire, and fiber optics, including wires that include bus 602. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, memory cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PSTN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method of storing a composite array including a reference array and one or more arraylets, the method comprising:
   determining, by one or more processors, a length of a logical array;
   determining a binary representation of the length of the logical array;
   allocating, based on a quantity of bits in the binary representation, a set of contiguous memory locations for a reference array including one or more slots, each slot in the reference array corresponding to a position of a bit in the binary representation of the length of the logical array;
   determining whether each bit corresponding to a slot satisfies a condition;
   for each bit corresponding to a slot that is determined to satisfy the condition:
      allocating a set of contiguous memory locations for an arraylet having a length based on a position of the slot in the reference array; and
      providing in the slot a reference to the arraylet;
   identifying a largest arraylet having a greatest length of the allocated arraylets; and
   placing into the largest arraylet a slice of adjacent data elements corresponding to a beginning of the logical array.

2. The method of claim 1, wherein the largest arraylet is referenced by a slot corresponding to a bit that satisfies the condition and the corresponding bit is the most significant one bit in the binary representation.

3. The method of claim 1, further comprising:
   sequentially placing into the one or more arraylets a slice of adjacent data elements of the logical array, wherein the sequentially placing includes:
      the placing into a first arraylet a first slice of adjacent data elements, the first arraylet being the largest arraylet;
      determining whether all data elements corresponding to the logical array have been placed into an arraylet in memory; and
      when it is determined that all data elements corresponding to the logical array have not been placed into an arraylet in memory, placing into a second arraylet a second slice of adjacent data elements corresponding to the logical array, the second slice being adjacent to the first slice and the second arraylet having a next greatest length after the largest arraylet.

4. The method of claim 3, wherein the second arraylet is referenced by a slot corresponding to a bit that satisfies the condition and the corresponding bit is closest to the most significant bit in the binary representation that satisfies the condition compared to other bits in the binary representation that satisfy the condition.

5. The method of claim 1, wherein when a bit corresponding to a given slot in the reference array is determined to not satisfy the condition, the given slot does not reference an arraylet.

6. The method of claim 1, wherein when a bit corresponding to the slot represents a binary one, the bit satisfies the condition.

7. The method of claim 1, wherein the arraylet length associated with each successive slot in the reference array is equal to two times the arraylet length associated with the preceding slot in sequential order.

8. The method of claim 1, further comprising:
   receiving an access request directed to a composite array in memory, the composite array including the reference array and one or more arraylets, and the access request including a logical array index value of the logical array to access;

determining which slot in the reference array references a given arraylet corresponding to the logical array index value; and providing access to a data element at an arraylet index of the given arraylet, the arraylet index corresponding to the logical array index value of the logical array, wherein the determining which slot in the reference array references a given arraylet includes applying an equation equivalent to S=W−1−clz(N XOR K), wherein S represents the slot in the reference array that references the given arraylet, wherein W represents the quantity of bits in the binary representation, wherein N represents the length of the logical array, and wherein K represents the logical array index value, and wherein the providing access to a data element at an arraylet index includes calculating an offset into the given arraylet, wherein the calculating an offset includes applying an equation equivalent to I=K AND (2^S−1), wherein I represents the offset into the given arraylet.

9. The method of claim 1, further comprising:

receiving an append request directed to a composite array in memory, the composite array including the reference array and one or more arraylets, and the append request including a data element to append to the logical array; and allocating, based on the append request, memory for an updated version of the logical array, wherein the allocating memory for an updated version includes:

determining an updated length of the updated version of the logical array;

determining a second binary representation of the updated length of the logical array;

allocating, based on a second quantity of bits in the second binary representation, a set of contiguous memory locations for a second reference array including one or more slots, each slot in the second reference array corresponding to a position of a bit in the second binary representation;

determining whether the first reference array includes a slot that does not reference an arraylet;

when the first reference array is determined to include a slot that does not reference an arraylet:

identifying a first slot in the first reference array having a position closest to a beginning of the first reference array and that does not reference an arraylet;

identifying a second slot in the second reference array corresponding to the first identified slot;

allocating a set of contiguous memory locations for a second arraylet having a length based on the position of the second identified slot; and providing in the second identified slot a reference to the second arraylet;

placing into the second arraylet a slice of one or more adjacent data elements corresponding to an end of the logical array and including the data element in the append request; and for each slot in the second reference array that is after the second identified slot and that corresponds to a bit in the second binary representation that satisfies the condition:

providing in the slot in the second reference array a reference to an arraylet that is referenced by the corresponding slot in the first reference array; and when the first reference array is determined to not include a slot that does not reference an arraylet:

allocating a set of contiguous memory locations for a third arraylet having a length based on the position of a slot in the second reference array that satisfies the condition;

identifying a third slot in the second reference array corresponding to a bit that satisfies the condition;

providing in the third identified slot a reference to the third arraylet; and placing into the third arraylet all data elements of the logical array and the data element in the append request.

10. The method of claim 9, wherein the first and second reference arrays have a common length.

11. A system for storing a composite array including a reference array and one or more arraylets, comprising:

a logical array module to determine a length of a logical array and to determine a binary representation of the length of the logical array;

a reference array allocator to allocate, based on a quantity of bits in the binary representation, a set of contiguous memory locations for a reference array including one or more slot, wherein each slot in the reference array corresponds to a position of a bit in the binary representation of the length of the logical array;

an arraylet allocator to determine whether each bit corresponding to a slot satisfies a condition, wherein for each bit corresponding to a slot that is determined to satisfy the condition, the arraylet allocator:

allocates a set of contiguous memory locations for an arraylet having a length based on a position of the slot in the reference array; and provides in the slot a reference to the arraylet; and a placement module to identify a largest arraylet having a greatest length of the allocated arraylets and place into the largest arraylet a first slice of adjacent data elements corresponding to a beginning of the logical array.

12. The system of claim 11, wherein a least significant bit of the binary representation corresponds to a slot index at a beginning of the reference array, and adjacent bits in the binary representation correspond to adjacent slot indexes in the reference array.

13. The system of claim 11, wherein the reference array allocator determines a quantity of leading zeros preceding the most significant one bit in the binary representation, updates the binary representation by discarding the quantity of leading zeros from the binary representation, and identifies a second quantity of bits in the updated binary representation, wherein the reference array allocator allocates the set of contiguous memory locations for the reference array based on the quantity of bits in the binary representation and the quantity of leading zeros, wherein the quantity of slots in the reference array is equivalent to the second quantity of bits in the updated binary representation.

14. The system of claim 11, wherein the reference array allocator determines a quantity of trailing zeros following the least significant one bit in the binary representation, updates the binary representation by discarding the quantity of trailing zeros from the binary representation, and identifies a second quantity of bits in the updated binary representation, wherein the reference array allocator allocates the set of contiguous memory locations for the reference array based on the quantity of bits in the binary representation and the quantity of trailing zeros, wherein the quantity of slots in the reference array is equivalent to the second quantity of bits in the updated binary representation.

15. The system of claim 11, wherein when a bit corresponding to the slot represents a binary one, the bit satisfies the condition.

16. The system of claim 11, wherein the arraylet length associated with each successive slot in the reference array is equal to two times the arraylet length associated with the preceding slot in sequential order.

17. The system of claim 11, wherein the placement module determines whether all data elements corresponding to the logical array have been placed into an arraylet in memory, and when it is determined that all data elements corresponding to the logical array have not been placed into an arraylet in memory, the placement module places into a second arraylet a second slice of adjacent data elements corresponding to the logical array, wherein the second slice is adjacent to the first slice and the second arraylet has a next greatest length after the largest arraylet.

18. The system of claim 11, wherein the logical array module receives an access request directed to a composite array in memory, the composite array including the reference array and the one or more arraylets, and the access request includes a logical array index value of the logical array to access,
   wherein the reference array allocator determines which slot in the reference array references a given arraylet corresponding to the logical array index value and provides access to a data element at an arraylet index of the given arraylet, wherein the arraylet index corresponds to the logical array index value of the logical array,
   wherein the reference array allocator applies an equation equivalent to $S = W - 1 - \text{clz}(N \text{ XOR } K)$,
      wherein S represents the slot in the reference array that references the given arraylet,
      wherein W represents the quantity of bits in the binary representation,
      wherein N represents the length of the logical array, and
      wherein K represents the logical array index value.

19. The system of claim 18, wherein the reference array allocator calculates an offset into the given arraylet by applying an equation equivalent to $I = K \text{ AND } (2^S - 1)$,
   wherein I represents the offset into the given arraylet.

20. A non-transitory machine-readable medium comprising a plurality of machine-readable instructions that when executed by one or more processors is adapted to cause the one or more processors to perform a method comprising:
   determining a length of a logical array;
   determining a binary representation of the length of the logical array;
   allocating, based on a quantity of bits in the binary representation, a set of contiguous memory locations for a reference array including one or more slots, each slot in the reference array corresponding to a position of a bit in the binary representation of the length of the logical array;
   determining whether each bit corresponding to a slot satisfies a condition, wherein when a bit corresponding to the slot represents a binary one, the bit satisfies the condition;
   for each bit corresponding to a slot that is determined to satisfy the condition:
      allocating a set of contiguous memory locations for an arraylet having a length based on a position of the slot in the reference array; and
      providing in the slot a reference to the arraylet;
   identifying a largest arraylet having a greatest length of the allocated arraylets; and
   placing into the largest arraylet a slice of adjacent data elements corresponding to a beginning of the logical array.

* * * * *